United States Patent
Mehdizadeh et al.

(10) Patent No.: US 6,315,972 B1
(45) Date of Patent: Nov. 13, 2001

(54) GAS PHASE CATALYZED REACTIONS

(75) Inventors: Mehrdad Mehdizadeh; Theodore A. Koch, both of Wilmington, DE (US); Karl Robert Krause, Orange, TX (US); Sourav Kumar Sengupta, Wilmington; Benny Earl Blackwell, Newark, both of DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/190,051

(22) Filed: Nov. 10, 1998

Related U.S. Application Data

(60) Division of application No. 08/887,549, filed on Jul. 3, 1997, now abandoned, which is a continuation-in-part of application No. 08/693,728, filed on Aug. 7, 1996, which is a continuation of application No. 08/189,471, filed on Feb. 1, 1994, now abandoned.

(51) Int. Cl.$^7$ .................................................. C01C 3/02
(52) U.S. Cl. ...................................... 423/376; 204/157.46
(58) Field of Search ...................................... 423/376, 659; 204/157.44, 157.46

(56) References Cited

U.S. PATENT DOCUMENTS

| | | | |
|---|---|---|---|
| 1,986,348 | 1/1935 | Lacy et al. | 423/376 |
| 4,954,320 | 9/1990 | Birmingham et al. | 422/186.04 |
| 5,110,996 | 5/1992 | Edwards | 570/159 |
| 5,324,904 | 6/1994 | Cresswell et al. | 219/635 |
| 5,401,483 | * 3/1995 | Ostroff | 423/376 |
| 5,470,541 | * 11/1995 | Koch et al. | 422/186 |
| 5,480,524 | 1/1996 | Oeste | 204/158.2 |

FOREIGN PATENT DOCUMENTS

| | | |
|---|---|---|
| 1593473 | 7/1981 | (GB). |
| WO 95/21126 | 8/1995 | (WO). |

* cited by examiner

Primary Examiner—Stuart L. Hendrickson

(57) ABSTRACT

This invention relates to improvements in processes and catalysts for elevated temperature, gas phase, catalyzed reactions in general; it is particularly illustrated by reference to the manufacture of hydrogen cyanide.

15 Claims, 6 Drawing Sheets

GAS PHASE CATALYZED REACTIONS

CROSS-REFERENCE TO RELATED APPLICATIONS

Figure 1:
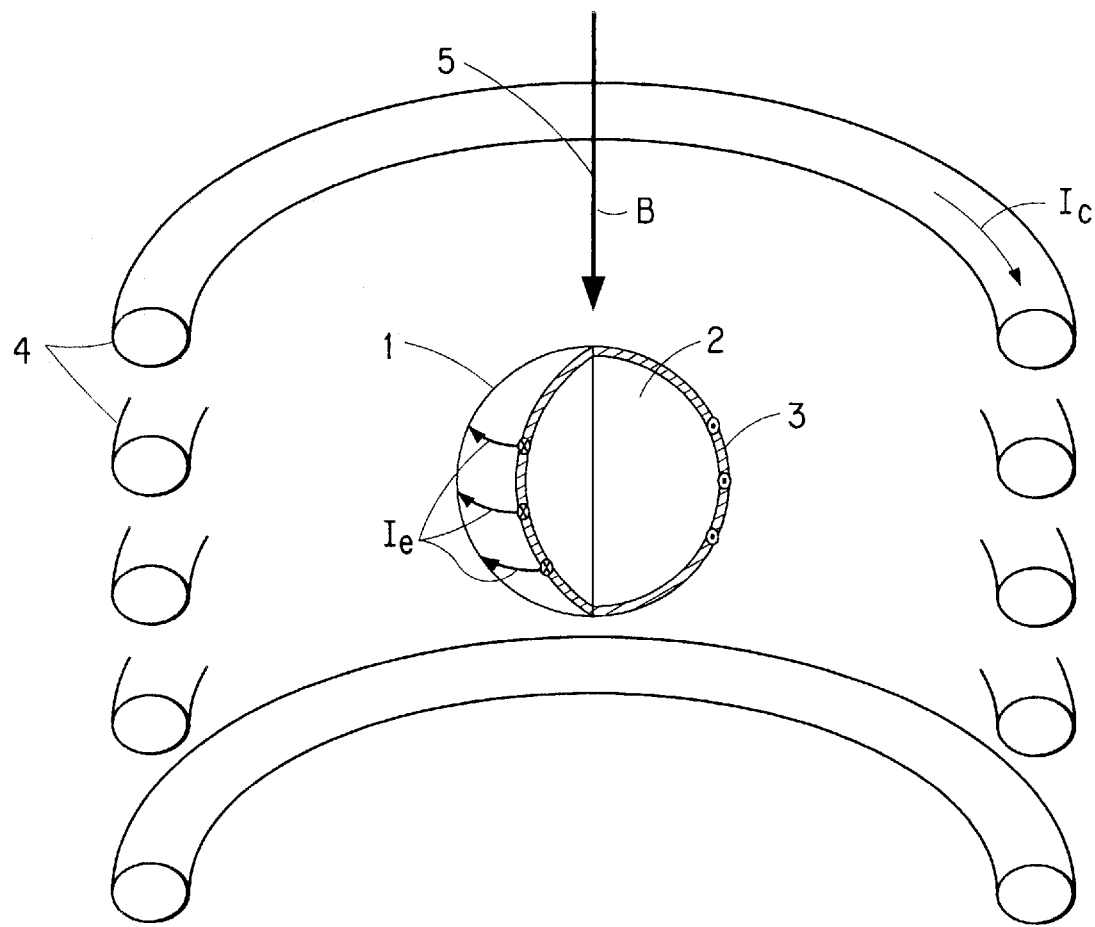

This application is a divisional of abandoned Ser. No. 08/887,549 filed Jul. 3, 1997 which is a continuation-in-part of application Ser. No. 08/693,728 filed Aug. 7, 1996, which in turn is a continuation of abandoned application Ser. No. 08/189,471 filed Feb. 1, 1994.

FIELD OF THE INVENTION

This invention relates to elevated temperature, gas phase, catalyzed reactions in which induction heating is used as a source of energy. While the invention relates to improvements in processes and catalysts for elevated temperature, gas phase, catalyzed reactions in general, it is particularly illustrated herein by reference to the manufacture of hydrogen cyanide.

BACKGROUND OF THE INVENTION

Induction heating is a non-contact method of selectively heating inducing a magnetic field into the material to be heated. Because induction heating uses alternating magnetic fields, it is only capable of heating electrically-conductive materials; i.e. the eddy current effect. Induction heating has been used in industry for may years, mainly for the purpose of heating metals, e.g. in annealing and soldering. However, figures of merit for induction heating of solid pieces of metal are significantly different from those for heating typical catalysts.

Hydrogen cyanide, hereinafter HCN, is an important chemical with many uses in the chemical and mining industries. For example, HCN is a raw material for the manufacture of adiponitrile for use in nylon; acetone cyanohydrin to make methyl methacrylate for acrylic plastics; sodium cyanide for use in gold recovery; and intermediates in the manufacture of pesticides, agricultural products, chelating agents, and animal feed. HCN is a highly toxic liquid boiling at 26 degrees C. and as such, is subject to stringent packaging and transportation regulations. In some applications, HCN is needed at remote locations distant from large scale HCN manufacturing facilities. For example, it is used in preparing cyanide derivatives on sites at which the derivatives will be used. Shipment of HCN to such locations involves major hazards. Local production of the HCN at sites at which it is used avoids the transportation hazards. However, this clearly requires the installation of a large number of small production facilities and is an expensive option.

As a rule, HCN is produced when compounds containing hydrogen, nitrogen, and carbon are brought together at high temperatures, with or without a catalyst. HCN is most commonly produced industrially by either the exothermic Andrussow process and the endothermic Degussa process or, to a lesser extent, the endothermic Shawinigan process. Other processes for making HCN that have not been significantly exploited commercially, due primarily to unsatisfactory economics, include formamide decomposition, methanol ammonolysis, and reaction of acid with sodium cyanide. HCN is also produced as a by-product in the Sohio process for the synthesis of acrylonitrile from propene and ammonia.

In all of the foregoing processes, the emerging product stream must be promptly cooled below about 300 degrees C. to prevent thermal degradation from occurring. Additionally, unreacted ammonia, termed "ammonia breakthrough", must be removed since it can catalyze the polymerization of HCN, a process that can lead to explosions. In large plants the ammonia is recovered and recycled, in smaller units it may be burned or removed as ammonium sulfate, although the disposal processes involve environmental concerns over nitrogen oxide emissions and ammonium sulfate disposal respectively.

While it is known that HCN can be produced by the reaction of $CH_4$ and $NH_3$ in the presence of a Pt group metal catalyst, there is still a need to improve the efficiency of that process and related ones so as to improve the economics of HCN production, especially small scale production. It is particularly important to minimize energy use and ammonia breakthrough while maximizing the HCN production rate versus the amount of precious metal catalyst. Furthermore it is desired to improve activity and life of catalysts used in this process. Significantly, a large part of the investment in production of HCN is in the platinum group catalyst. The present invention accomplishes these desiderata.

SUMMARY OF THE INVENTION

This invention relates to a catalyst and process for conducting elevated temperature, gas phase, catalyzed reactions in which the catalyst is heated by induction heating, whereby the heated catalyst provides the reactants with the heat needed for the reaction. By relying on inductive heating of the catalyst, rather than the prior art processes directed to heating the reaction vessel or a portion thereof or the like and thereby heating the catalyst by conduction, radiation and/or convection, considerable advantages are realized.

DETAILED DESCRIPTION OF THE INVENTION

In the process of this invention, one or more reactants are contacted with a catalyst bed comprising a substantially uniformly distributed multiplicity of discrete substantially uniform susceptor entities. Preferably said multiplicity of susceptor entities is substantially uniformly distributed in a three dimensional array. The susceptor entities are heated by induction heating at a frequency between 50 Hz to 30 MHz to a temperature sufficient to effect reaction of said reactants. The improved catalyst of this invention comprises multiple susceptor entities that function as independent induction heating susceptors while providing a large catalytic surface area. By "susceptor entity" as used hereinafter, is meant pellets, rings, or rods, containing a core externally coated with a substantially uniform and complete catalytic metal wrap, coating, or surface impregnation, or containing the catalytic metal as a foam. The susceptor entities are distributed subsantially uniformly within the reaction zone volume, physically disposed such that electrical conduction between the susceptor entities is minimal and to allow uniform and turbulent flow of gas between them, and are positioned such that the largest eddy current path formed on them is substantially in the same plane as the current flow in the induction coil. The susceptor entities comprise one or more metals from Groups Ib, IIb, IIIa, IVa & b, Vb, VIb, VIIb, or VIII, hereinafter sometimes referred to as "catalytic metals". The term "catalytic metal" is also used hereinafter to describe the above-described metals or alloys thereof, particularly platinum, platinum-iridium alloy, or platinum-rhodium alloy. The electrical conductivity between susceptor entities is substantially less than the surface conductivity of such entities. The susceptor entities must have sufficient electrical conductivity, and the size and geometry of said entities must be such that during heating by induction, said entities would include a sufficiently large eddy current path in the plane of the the coil current to have sufficient induction heating efficiency and sufficient surface area efficiently to promote catalytic activity. Preferably, induction heating is carried out at a frequency between 3 KHz to 30 MHz, and most preferably between 3 KHz to 450 KHz.

The process of this invention involves the inductively heating the susceptor entities of this invention to an elevated temperature sufficient to effect gas phase reactions. The process is suitable for reactions in which additional heat must be provided to the catalyst zone to maintain the reaction, and particularly to endothermic reactions. A convenient example reaction for the application of the process of this invention is an improved process for the production of hydrogen cyanide, the improvement comprising a reaction zone containing susceptor entities in the form of one or more of the aforesaid catalytic metals, particularly a Group VIII or platinum group metal catalyst, coated on or applied to the outside of a refractory support structure. The dimensions and electrical properties of the catalyst are designed for inductive heating of the susceptor entities and maximum electrical efficiency.

The core or support structure is comprised of pellets, rings, or rods of a conductive or non-conductive refractory material selected from materials that minimize the decomposition of ammonia at the reaction temperatures. The support structure is externally covered with, coated with, or impregnated with platinum or a platinum-iridium or platinum-rhodium alloy. The term "catalyst bed" as used hereinafter is used to describe a plurality of susceptor entities placed or arranged in a containment and which is heated inductively to function as the reactor.

FIG. 1 illustrates the principles underlying induction heating, while various embodiments of the present invention are illustrated by FIGS. 2 to 5.

FIG. 1 shows a schematic diagram of an example of a single susceptor entity 1 consisting of a core support 2 and catalytic metal coating 3 inside an induction coil 4. The alternating coil current $I_c$ in the coil induces an alternating magnetic field 5, inducing an eddy current $I_e$ in the catalytic metal in a plane parallel to the coil current $I_c$. The induced current $I_e$ causes heating; larger eddy currents generating more heat. As the radius of the susceptor entity increases or as higher frequencies are used, larger eddy currents are generated.

Figure 2:
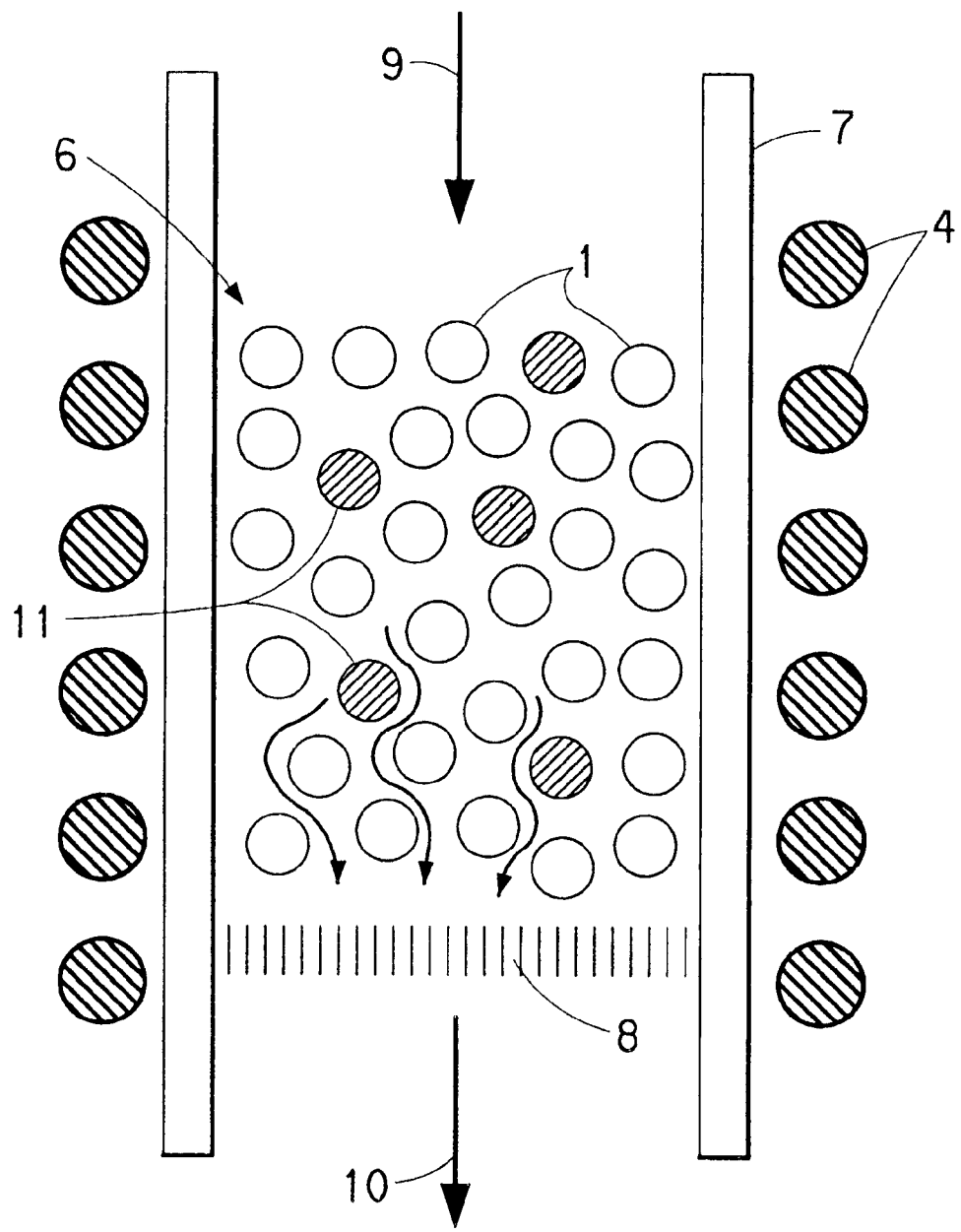

FIG. 2 shows a catalyst bed 6 comprised of many susceptor entities 1 in the approximately spherical form shown for susceptor entity 1 in FIG. 1, arranged in a three dimensional array in a tube 7 with porous retainers 8. Reactant gases enter at 9 and product gases exit at 10. Even if in contact, the point contacts between rigid pellets have very high inter-pellet resistance, thus pellets are, in effect, electrically separated. Alternative entities 11 are ones which lack inductive efficiency, and at the same time may additionally lack catalytic activity. Induction coil 4, containing tube 7, and retainers 8 are as described for FIG. 1.

By the term "alternative entity" as used herein is meant an entity having the same composition as that of the core or support structure of a susceptor entity, but which itself is not a susceptor or is an inefficient susceptor; moreover, the alternative entity may or may not have sufficient catalytic activity. The alternative entity has the same requirements for mechanical strength, minimal tendency to cause undesired reactions, and ability to withstand high temperatures under catalyst bed conditions as the susceptor entity. The size of alternative entities is typically similar to that of the susceptor entities, e.g., of a size that no single diameter exceeds 0.25 times, and preferably does not exceed 0.125 times, the diameter of the reactor. The alternative entities are always of a size sufficient to maintain the flow characteristics of the catalyst bed, for example, the pressure drop across the bed. The alternative entities optionally have catalytic activity. Specific examples of catalytically active alternative entities are the alumina spheres impregnated with 5% platinum as used in Examples 1 to 11, 20 to 29, and 41 to 43 hereinbelow.

Figure 3A:
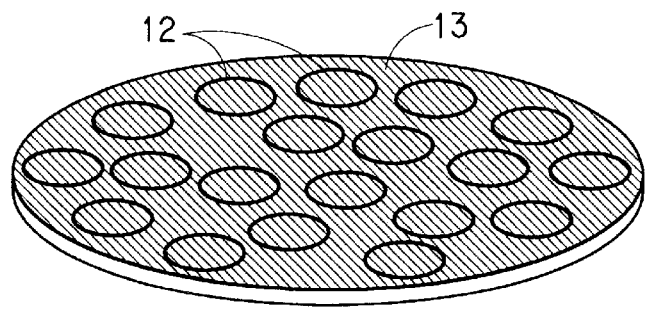
Figure 3B:
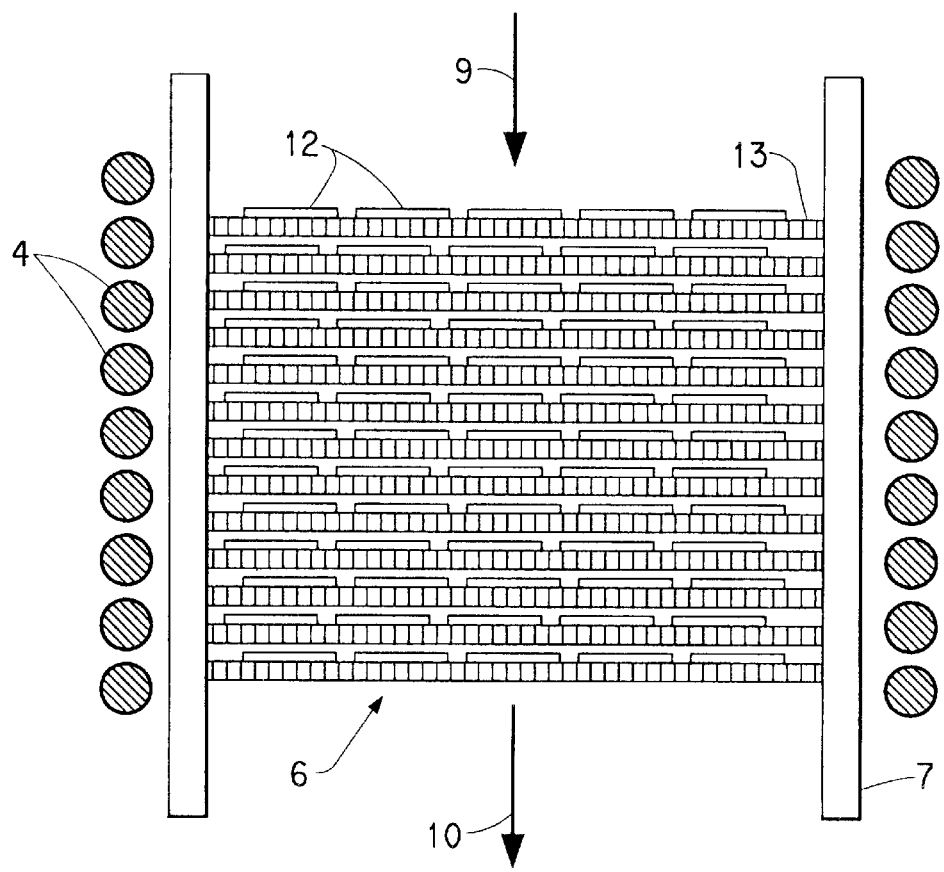

In FIG. 3, the catalyst bed 6 is made up of a multiplicity of susceptor entities 12, comprising substantially planar catalytic metal annuli, which are distributed over and secured to porous retainer plates 13, with none of the annuli contacting one another. The porosity of retainer plate 13 is sufficient to permit the passage of gaseous materials. Multiple layers of alternating retainer plates 13, to which annuli 12 are secured, comprise reactor 11. Said retainer plates 13 are stacked within reactor 11 in such a way that the plane of susceptor entities 12 is substantially parallel to the plane of the induction coil 4. Catalytic metal annuli 12 can be cut from solid catalytic metal or from catalytic metal gauze for more surface area. The induction coil 4, containing tube 7 and gas flows 9 and 10 are as described for FIG. 2.

Figure 4A:
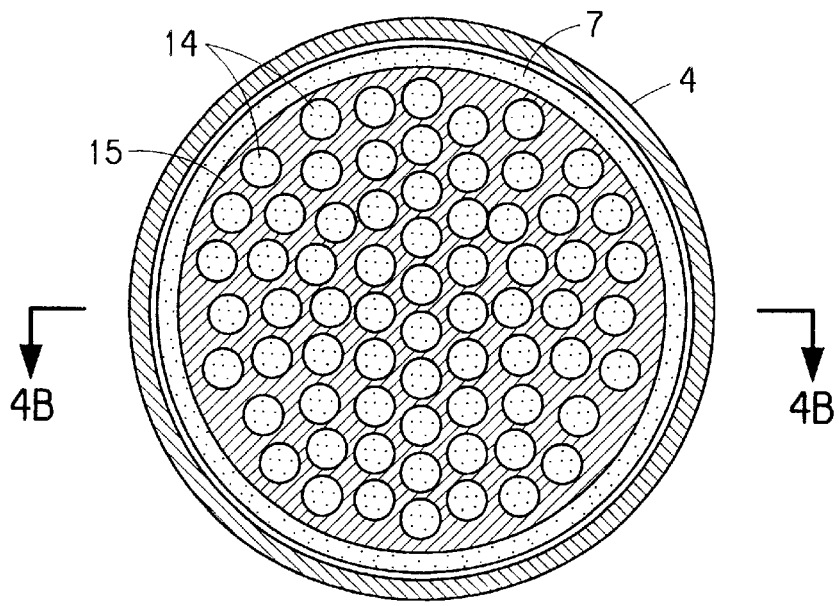
Figure 4B:
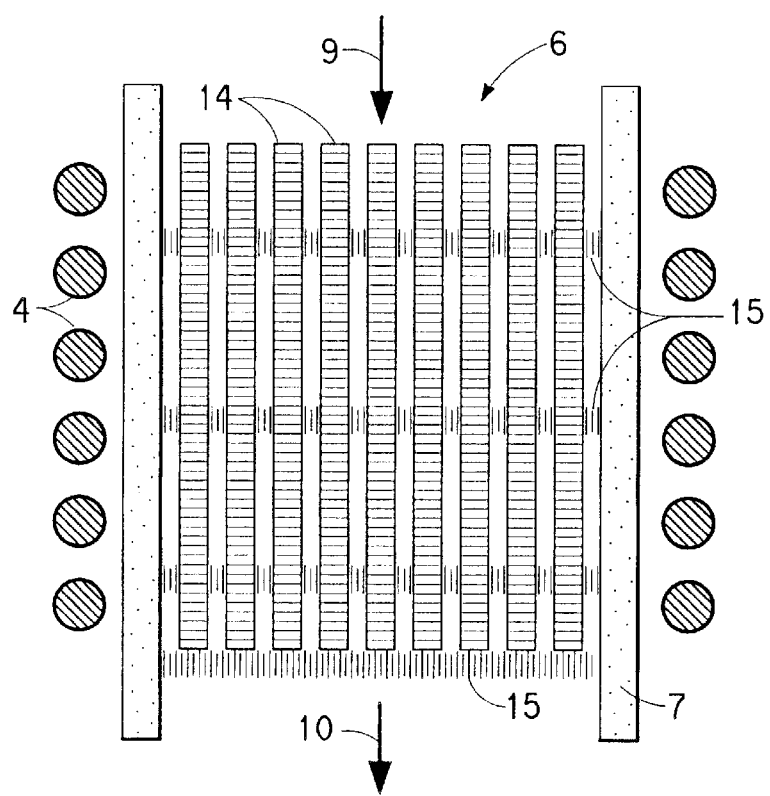

FIG. 4 shows an embodiment in which the catalyst bed 6 is comprised of many susceptor entities 14 as parallel rods held in place by porous retainers 15. Rods 14 are wrapped, coated, or surface-impregnated with catalytic metal on the outside, and can be solid or hollow tubes having both ends closed. The core material of rods 14 can be conductive or non-conductive. Porous retainers 15 maintain separation between rods 14 and help maintain turbulent flow in the reactor bed. Like retainer plate 13 of FIG. 3, the porosity of porous retainer 15 is sufficient to permit the passage of gaseous materials. Susceptor entities 14 are disposed so that the rod circumference is in a plane which is substantially parallel to the flow of current in induction coil 4. Induction coil 4, containing tube 7, and gas flows 9 and 10 are as described for FIG. 2.

Figure 5:
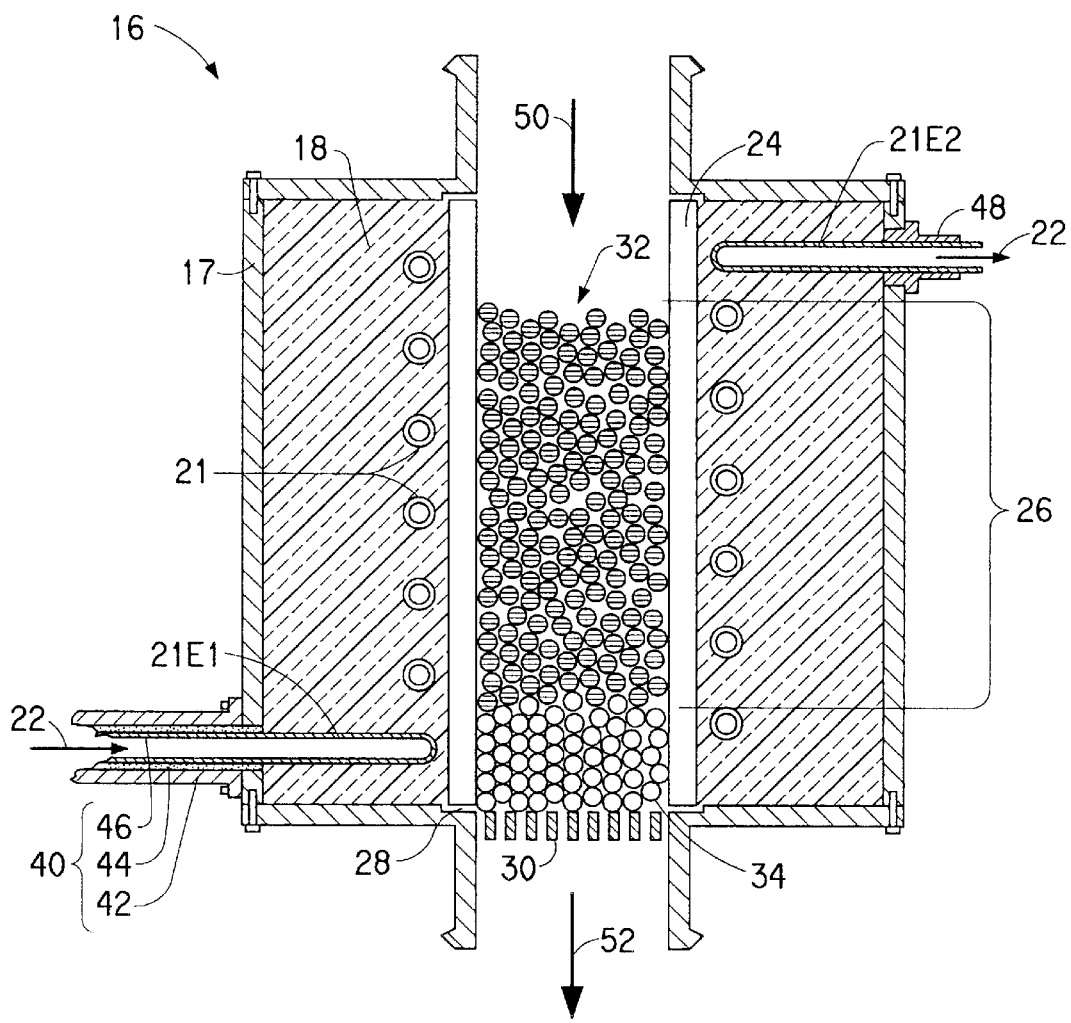

FIG. 5 is a sectional view which illustrates a preferred embodiment of this invention. Reactor 16 comprises an external reactor casing 17, an annular thermal insulating region 18, an induction coil 21, and an electrically non-conducting annular partition 24. Induction coil 21 is made of a tubular conductor, through which a coolant 22 (supplied by an external coolant source, not shown) flows. The region inside annular partition 24 defines a reaction zone 26. A small gap 28 between annular partition 24 and casing 17 serves to relieve pressure-related stresses on annular partition 24. A porous grid 30 supports a bed of susceptor entities 32 on a support means 34. Support means 34 is shown as a bed of electrically non-conductive entities, but any suitable electric non-conductive support means can be used. A first end 21E1 of induction coil 21 is energized (by an alternating current power source, not shown) through a coaxial line 40 comprising an outer jacket 42 which is electrically connected to casing 17, a dielectric layer 44, and a center conductor 46. A second end 21E2 of induction coil 21 is electrically connected to casing 17 by ferrule 48 which serves as the electrical ground. Dielectric layer 44 is comprised of a material having sufficient dielectric strength to withstand the voltage imposed between center conductor 46 and outer jacket 42, and will withstand chemical attack as well from either fluid 50 entering reaction zone 26 and fluid 52 exiting reaction zone 26.

In the process of this invention, the catalytic metal acts both as a catalyst and as a susceptor for induction heating.

The catalytic site is the location at which the energy of the alternating magnetic field is turned into heat. This heat generates the temperature needed to maintain the catalyst temperature and, in the case of an endothermic reaction, supplies the necessary energy for the reaction to proceed.

In one embodiment of this invention, the wrapped susceptor entity supports are mechanically covered with the catalytic metal (i.e. one or more of the aforesaid Group I–VIII metals) as thin foil, knitted or woven gauze, or other mechanical or manual means of covering the support. When mechanical and manual methods for applying foil or gauze are used, spherical support shapes or short cylindrical support shapes having length to diameter ratios of about 0.2 to 5 are preferred as such shapes allow a well-supported catalytic metal surface while minimizing foil or gauze use. The foil or gauze is wrapped around the support with an overlap of not less than about 10% of the circumference, then wire-bonded, laser bonded, or welded on the overlap area. When foil- or gauze-wrapped non-conductive cores are used, the equivalent thickness is related to the frequency. For conductive cores the thickness of the foil becomes relatively unimportant as previously discussed.

In a second embodiment, the susceptor entity supports are coated with an adhering layer of the catalytic metal by technologies well known to those skilled in the art, and including but not limited to, electron beam deposition or sputtering. In practice, some such techniques are limited to the production of relatively thin catalytic metal layers such as those on conductive cores.

In a third embodiment, the susceptor entity supports are impregnated with catalytic metal such as by coating the supports with catalytic metal salts or a suspension of the catalytic metal, drying, calcining, and reducing to leave an adherent catalytic metal coating. The level of impregnation should be such that the catalytic metal forms a continuous film across the surface of the support.

In a fourth embodiment, the support is comprised of the catalytic metal as a solid foam. The catalytic metal foam is prepared by mixing the metal powder with urethane, followed by slow sintering and pyrolysis. The porosity of the foam should be between 4 pores per cm (ppcm) to 25 ppcm, preferably between 8 to 20 ppcm, and the foam must have the minimum mechanical strength of 27 kPa by Test Method, below, to prevent excessive compaction under operating conditions.

In a fifth embodiment, porous and non-regular shapes are formed from knitted or woven catalytic metal. Pieces are cut and optionally crumpled into pellets of shape and dimensions as described above for conductive core pellets. In such cases, the catalytic metal provides its own support. Typically, application of the present invention to the catalytic forms of the prior art is less preferred as the use of the catalytic metal is not minimized, but may be convenient to use in laboratory scale work.

In a sixth and particularly preferred embodiment, the susceptor entities are randomly mixed with alternative entities in the catalyst bed (e.g. as illustrated in part by FIG. 2). In this embodiment, the catalyst bed is comprised of susceptor entities or a mixture of susceptor entities and alternative entities such that the susceptor entity component is in an amount sufficient to effect the reaction. Typically, the volume proportion of susceptor entities to total entities is 5% to 100%, preferably 25% to 100%, and most preferably 25% to 75%. In the case where the alternative entity is deficient in catalytic activity but none-the-less possesses some catalytic activity, the use of a combination of susceptor entities, and alternative entities can provide 1) increased catalytic surface area without increasing the volume of the catalytic metal, 2) increased catalytic reaction without increasing electrical energy supplied to the reactor, and 3) enhanced turbulent mixing of gas flow.

The generation of HCN is an important example of an elevated temperature gas phase catalyzed endothermic reaction. All elevated temperature gas phase catalyzed endothermic reactions as practiced in the prior art suffer to a greater or lesser degree from non-isothermal conditions, energy utilization inefficiency, high exit gas temperatures, and the product and process impairments that result. While HCN represents a critical case due to the transportation concerns detailed above and the high cost of the catalyst, other elevated temperature gas phase catalyzed reactions in which heat must be supplied to the catalyst to maintain the reaction, and particularly endothermic reactions, would benefit by utilizing the the process and catalyst of the present invention filled with catalytic susceptor entities, each of which heats independently by induction. It is an objective of the present invention to meet these needs by providing an optimized catalyst that is heated inductively using a low induction frequency.

Furthermore, it is desired to have alternative sources of carbon and nitrogen, in forms that may be easier to provide in remote areas where natural gas lines, or other sources of hydrocarbons and ammonia storage facilities may be lacking. It is desired to provide carbon and nitrogen in forms that are less hazardous to transport and by their less hazardous nature, are subject to fewer governmental regulations.

While the catalyst of this invention is applicable to elevated temperature gas phase reactions in general the improved process for the production of hydrogen cyanide will be used to describe the benefits of this invention.

To meet the requirements for maximum electrical efficiency and high efficiency in the use of the catalytic metal, the catalyst in the catalyst bed will generally meet the following criteria:

1. Most of the volume of each susceptor entity is either ceramic or a refractory metal, thereby providing high catalytic activity for a relatively small amount of the catalytic metal.
2. The catalyst bed will be mechanically stable. Since the flow of gas exerts continuous mechanical pressure, the catalyst must not be compressible.
3. The catalyst mass will have sufficient conductivity to interact with the alternating magnetic field and to generate heat without significant waste of electrical energy. The heat will be generated at the surface of the catalyst, with minimum energy generated elsewhere. The size of each susceptor entity will be large enough for the induction frequency chosen and the platinum coating or covering will be thick enough to conduct sufficient eddy currents on the surface. For example, for a 30 kHz induction frequency source, a bed of catalyst pellets, having a non-conductive core and a diameter of 2 cm, and being covered with catalytic metal foil of 0.025 mm thickness gives a 92% induction heating efficiency. For pellets having a diameter of 0.6 cm, the induction frequency efficiency at 30 kHz is only 50%. For catalyst susceptor entities with a conductive core, the surface of the core will contribute to satisfying this criterion.
4. The induction heating in the catalyst mass will take place uniformly to effect high conversion and avoid decomposition of reaction gases. In the case of a packed bed, each susceptor entity acts independently in the induction field. Conversely, if the whole mass of the catalyst bed were to be electrically connected, induction technology predicts most of the heat would be generated in the periphery of the bed while the center of the bed would remain relatively cooler. The point contacts between rigid granules or pellets have very high inter-pellet resistance, thus pellets are, in effect, electrically separated.

The present invention implements the above criteria by utilizing ceramic or metal cores with a wrapping or coating of catalytic metal or catalytic metal foil or gauze. The catalyst is selected and prepared to provide the catalytic metal in a thermally and mechanically stable structure that provides a continuous path in each individual catalyst susceptor entity to maintain conductivity.

The relationship between induction frequency (f) and maximum induced current (equivalent to the electrical heat generating efficiency) in thin-walled tubes is determined by the tube diameter, tube thickness, and the resistivity of the tube material as described in "Induction Heating" N. R. Stansel, McGraw-Hill, 1949, p. 102, New York N.Y. A mathematical analysis of a situation in which one coil heats many independent susceptors is not available. However, although the catalyst susceptor entities of the present invention are not thin walled tubes, we find the relationship does hold approximately for the pelletized form of the catalyst of this invention. For a thin-walled tube of wall thickness t, outside radius a, resistivity rho in ohm-cm, and reference dimension p (the reference dimension is a characteristic property of the susceptor and frequency), and where $$t \ll p$$

and $$t/(a-t) \ll 1.0$$

Stansel's "maximum efficiency" is calculated to be $$f = k \times rho/t(a-t) \text{kHz}. \quad \text{(Formula 1)}$$

For foil-wrapped pellets of this invention containing a non-conductive core, p is ~0.025 cm, and the constant k is ~44,000 cm/s/ohm. For a ~2 cm pellet having t ~0.0025 cm and with the resistivity of the catalytic metal about 10 microohm-cm, the value of f calculates to be about 90 kHz.

Figure 6:
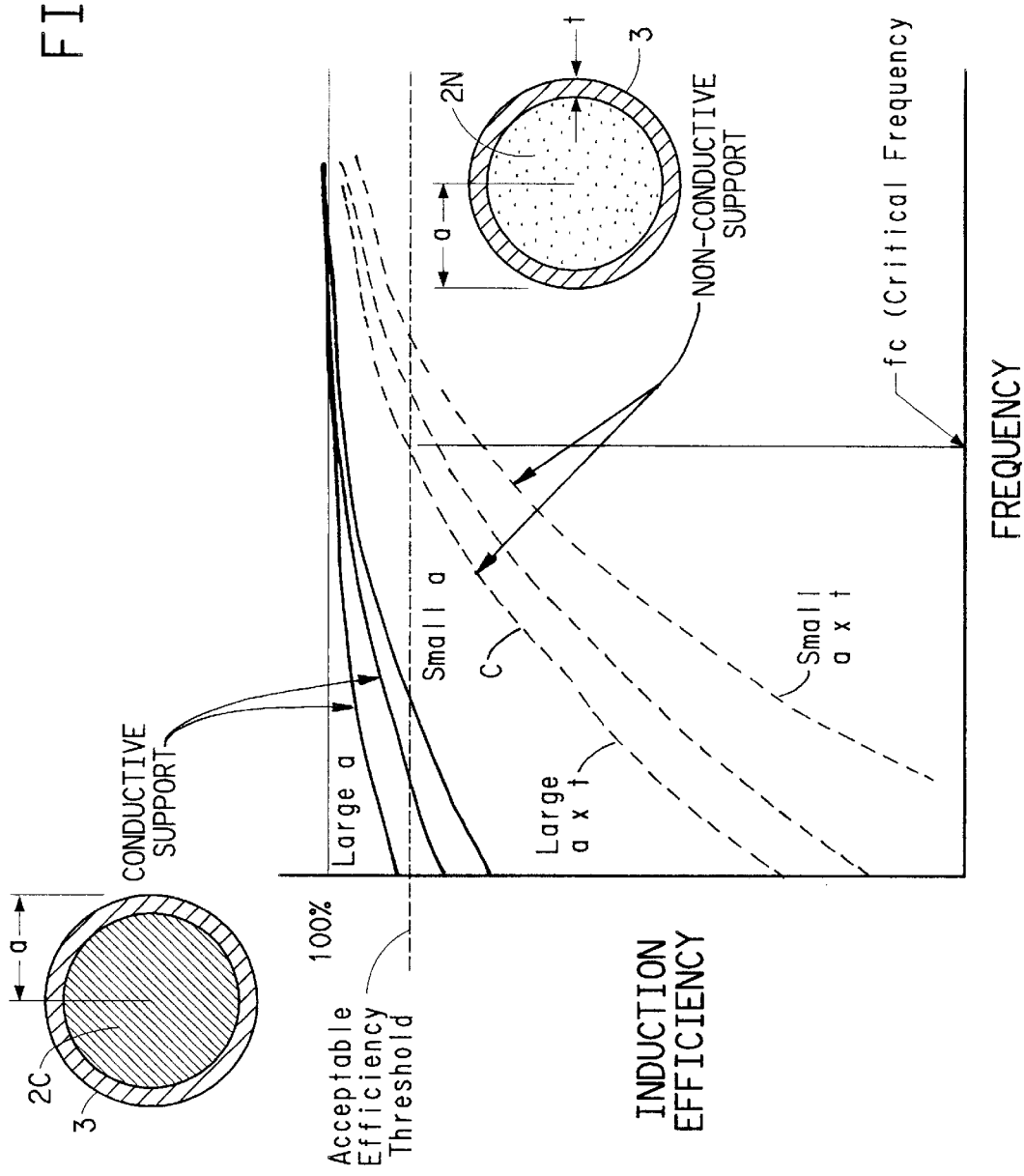

This relationship between frequency and electrical heating efficiency is shown in FIG. 6. A critical frequency, $f_c$, exists above which little increase in electrical efficiency can be gained. Above the critical frequency, other cost factors such as those of the generating equipment become dominant concerns. Conversely, below the critical frequency, efficiency drops rapidly and energy inefficiencies become a dominant concern. FIG. 6 shows the schematic frequency and efficiency relationships for three sizes of susceptor entities with conductive support (upper three curves) and three sizes with non-conductive support (lower three curves). The curves intersect an "acceptable efficiency threshold" from which the minimum frequency for each case can be read, as shown by the frequency axis intersect drawn for curve "C". The acceptable efficiency threshold is determined by economic analysis based on many specifc actors including plant design and local power costs. Solely for purposes of illustration in FIG. 6 and in subsequent examples, a value of about 90% is assumed. FIG. 6 represents qualitative sets of efficiency curves for susceptor entities on conductive and non-conductive supports. In all cases, efficiency increases with frequency, approaching 100% asymptotically. Higher efficiencies can be achieved with a smaller diameter susceptor entity when the support is conductive, but conductive supports have other disadvantages as described below. In FIG. 6, large, intermediate, and small sizes of conductive support are approximately equivalent to those for the non-conductive support.

If the susceptor entities are wrapped with a catalytic metal fabric or gauze instead of foil, factors such as the wire thickness and mesh size alter the effective resistivity of the catalytic metal coating and may be expressed in terms of equivalent thickness. This equivalence may be measured, for instance a particular gauze of overall thickness 0.015 cm may be equivalent in conductivity to a 0.0025 cm foil. Similar equivalent thickness values can be obtained for susceptor entities coated with catalytic metal powder.

For foil- or gauze-wrapped susceptor entities of this invention containing a conductive core, the thin platinum coating or covering is not the only material for electrical current conduction. A significant portion of the current flows in the conductive support. Experiments and calculations show that, in this case, smaller susceptor entities than in the non-conductive cases above give good induction efficiencies. Typically, the eddy current path length on the susceptor entity can be about ⅕ that of the non-conductive support case. Catalytic metal forms can also be used as susceptor entities.

The cost of induction power systems dictates that the frequency should be as low as possible. The reciprocal relationship between frequency and dimensions in Formula 1 above indicates the size of the susceptor entities should be as large as possible. However, effective packing of a reactor limits the maximum susceptor entity diameter to the range of 0.125 to 0.25 times the inside reactor diameter.

While in production operations of less than about 2250 kg/y the cost and maintenance of the power source may not be a determining factor, larger reactors operate with lower frequencies. In large scale, high frequency power sources are both more expensive and less robust. Power sources with frequencies greater than about 450 kHz typically use vacuum tubes, which are both less reliable and more expensive than the solid-state induction heating available from frequencies below about 450 kHz. The kHz limit for solid-state devices is also a function of the wattage requirements. In certain situations, a catalyst susceptor entity with a small diameter may be required, and thus a higher frequency. The industry standard of 30 kHz may conveniently be used in HCN production plants of 250,000 to 500,000 kg/yr capacity. Larger scale reactors would show improved economics using 3 kHz; very large reactors can use frequencies as low as 50 Hz.

The support structure (inappropriate cases also referred to herein as "cores") is an electrically conductive or preferably electrically non-conductive refractory material. Examples of the preferred non-conductive support structure include clays, oxides such as alumina, silica, zirconia, and titanium dioxide, or natural minerals such as beryl or spinel. The non-conductive support structures are monolithic or as a solid foam. Graphite/carbon can also be used as the core.

Conductive support structures are less preferred as they tend to promote ammonia decomposition but provide an advantage that smaller susceptor entities and thus smaller reactors can be used. Conductive support materials include metals chosen to minimize ammonia decomposition, such as tungsten, molybdenum, tantalum, zirconium, etc. The conductive support structures can also be monolithic or in the form of a solid foam. The requirement for a continuous catalytic metal covering on each susceptor entity of sufficient equivalent thickness is less stringent when the core is conducting, since induced currents will heat the conducting core as described immediately below. However, although the metal of the core is selected to minimize ammonia decomposition, exposed metal core will still contribute to some undesirable ammonia decomposition. The catalytic metals themselves may also be used as the support structure, for instance as crumpled foil or gauze, however this configuration does not minimize the amount of catalytic metal consumed.

When a solid metallic object is subjected to an induction field, the magnitude of eddy current decreases exponentially from the surface inward. The decrease is determined by the induction frequency and the conductivity of the metal. Zinn, et al., in Elements of Induction Heating, Electric Power Research Institute and American Society of Materials, 1988, at p. 15, defined a reference or skin depth d in cm as $$d=5,000(p/mf)^{0.5}$$

wherein p is the resistivity of the metal in Ohm-cm, m is the permeability of the metal (unity for nonferrous catalytic metals of this invention), and f is the frequency in Hertz.

The shapes of the support structure as pellets include shapes such as spheres, cylinders, rings, granules, saddles, toroids or doughnuts, stars, tubular cylinders trilobes, Raschig rings, etc. such as are conventionally used in gas phase reactions to provide optimum surface area per unit volume of reactor space. Support structures can also be rods or closed-end hollow cylinders. The size of the catalyst support is chosen such that the metal coated susceptor entity allows uniform gas flow and avoids by-passing in the reactor. For good flow and contact, the size of the metal coated susceptor entity also should be such that no single diameter exceeds 0.25 times, and preferably does not exceed 0.125 times, the diameter of the reactor. The support structure is wrapped coated, or impregnated with the catalytic metal such that the catalytic metal forms a continuous electrically conductive coating over its surface.

The mechanical crush resistance of the susceptor entity and alternative entity must be sufficient to prevent compaction of the bed under operating conditions and to avoid attrition from the high gas velocities across the bed. Excessive compaction of the bed can cause undesirable pressure drops across, and channeling within, the catalyst bed. Additionally, physical shifting or compaction of the catalyst will require re-tuning of the optimum induction frequency. Strength requirements are met by a strength of 27 kPa as determined by the Test Method below. As an example, a catalyst bed made of unsupported and very thin shavings, wires, etc. of catalyst metal may, due to lack of support and the pressure of gasses over time, allow the bed to compact excessively. In addition to causing catalysis problems, such movement would change the conductivity characteristics of the bed and cause the induction system to go out of optimum tuning. The catalytic metal wrapping must be secured to prevent unraveling. Coatings of catalytic metal must be suffciently adhered to the support to prevent mechanical removal of the coating by wiping.

A benefit of the catalyst and process of this invention is that it provides residence times much shorter than the Degussa process combined with HCN yields superior to the Degussa process. A further benefit is that exit gas temperatures are lower than in either the Andrussow or Degussa processes. The combination of a relatively pure HCN/hydrogen stream, absence of water, and lower exit temperatures provides benefits in any quenching step required.

In the practice of this invention, the prepared catalyst is packed in a vertical ceramic or quartz cylinder with a diameter based on the capacity and residence time chosen. The catalyst bed length is 0.5 to 10 times, and preferably 1 to 5 times, the catalyst bed diameter. The cylindrical catalyst bed is retained by perforated supports. In the cases of susceptor entities as annuli or rods, the supports also maintain spacing between susceptor entities and assist in establishing turbulence. The cylinder is surrounded by a conductive metal coil in close proximity to the catalyst, and coil and cylinder supported in a metal enclosure. A commercial induction heating generator capable of generating sufficient power in an alternating current at the required frequency of 50 Hz to 30 MHz, preferably 3 kHz to 30 MHz, and most preferably 3 kHz to 450 kHz, is connected to the induction coil through commonly known power matching techniques. Induced electric current in each catalyst susceptor entity heats that entity to the desired temperature. Temperature is monitored conventionally, for instance by probe or pyrometer, in a manner amenable to induction heating. The packed catalyst should provide the maximum surface area of exposed catalytic metal while providing a continuous path for maximum conductivity.

A detailed description of the materials of construction, power supply and engineering details is provided in copending application filed of even date herewith by Koch et al. now U.S. Pat. No. 5,958,273, the contents of which are incorporated herein by reference.

In the practice of the present invention, the reactants, mixed in approximately stoichiometric proportions, are passed through the heated catalyst bed at a pressure between 10 and 1000 kPa and preferably between 35 and 500 kPa. The choice of pressure is based upon optimization of the compressor size, catalyst bed, size of the product recovery equipment, and productivity. The catalyst bed temperature is within the ranges known in the art, and is dependent upon the reactant mixture.

In accordance with the present invention, HCN can be prepared by reacting ammonia with one or more aliphatic hydrocarbons, one or more aliphatic alcohols, one or more aliphatic amines, or one or more aliphatic amides; also by reacting urea with one or more aliphatic hydrocarbons or by reacting urea with one or more aliphatic alcohols, or by heating an aliphatic monoamine alone (i.e. in the absence of ammonia). The foregoing aliphatic compounds can contain up to 10 carbon atoms, preferably up to 4 carbon atoms. Reaction temperatures are in the ranges of 300 to 1,200 degrees C. For the reaction between methane and ammonia, temperature ranges are between 900 to 1,200 degrees C. and preferably between 1,000 to 1,150 degrees C. Particular illustrative examples of aliphatic alcohols include methanol and ethanol; illustrative examples of amines include methylamine and ethylamine; methane is illustrative of the hydrocarbons; formamide and acetamide are illustrative of amides. Clearly, numerous other reaction schemes can be written; the listed reactions are not to be construed as limiting the invention.

While the methane and ammonia reaction mixture is typically preferred, the other reactant mixtures can be used with the catalyst of this invention when the local availability of methane or ammonia is limited.

The residence time is between 0.001 and 5.0 seconds, and preferably between 0.01 and 1 seconds. The greatly improved efficiency of heating of the catalyst bed in the present invention provides a combination of improvements to the HCN synthesis, namely:

- lower contact or residence times compared to the Degussa process;
- lower exit gas temperature than the Degussa or Andrussow process;
- high overall yield of HCN, typically about 90% from ammonia in a preferred embodiment, compared to about 80% for the Degussa process;

low ammonia breakthrough, typically <0.2%, an order of magnitude less than in the Andrussow and Degussa processes; and rapid catalyst heating providing quicker startup and shutdown.

The low residence time and high yield of the process of this invention provide efficient use of the expensive catalytic metal. The efficient application of beat directly to the susceptor entities provides more efficient energy utilization. The low ammonia content in the off gas reduces formation of HCN polymer. The low anonia content in the exit gas also reduces the cost of expensive and extensive purification and recovery steps associated with the commercial processes of the prior art. The low ammonia content also reduces hazards associated with ammonia in the HCN stream and environmental concerns over the disposition of unreacted ammonia. The by-product hydrogen after HCN removal is of a high purity (=/>97%) and suitable for use as a by-product, as a high combustion fuel, or as a feedstock for an electricity generating fuel cell process.

Longer residence times do not have the detrimental effect on yields as seen with the Andrussow process, but are less preferred since they result in less efficient use of the catalytic metal.

Recovery and purification of the HCN can be made according to the prior art, but is substantially facilitated by the higher HCN and lower ammonia concentrations.

While the Examples 1–43 for the production of HCN were all conducted using 26 MHz, lower frequencies provide lower cost power sources with wider commercial availability. To test catalyst forms and induction efficiencies, there are commonly used simulations to measure the induction heating capability of materials. The techniques for such simulations are described by Zinn, el. al., in Elements of Induction Heating, Electric Power Research Institute and American Society of Materials, 1988 (cited above), at p. 29. Examples 44–46 utilize such measurements using a reactor simulation, and provide the information to extend the frequency range to 50 Hz from 30 MHz.

The catalyst configuration of the present invention, described in detail for the processes to prepare HCN from compounds containing hydrogen, nitrogen, and carbon at elevated temperatures over a platinum group metal catalyst, is also applicable to elevated temperature gas phase catalyzed reactions in general, using conventional feeds and metal catalysts such as the elements of Groups Ib, IIb, IIIa, IVa, IVb, Vb, VIb, VIIb, or VIII. Examples of such other applications are the preparation of synthesis gas from methane by steam reforming or dry reforming; cracking reactions of hydrocarbons for instance in refining processes; cracking of halocarbons, such as the preparation of tetrafluoroethylene from octafluorocyclobutane; or the environmentally safe destruction of volatile organic chemicals (VOC), for instance chlorofluorocarbons.

Test Method
Catalyst Strength

Catalyst strength or crush resistance is measured by the American Society for Testing Materials (ASTM) Method D41–79. A minimum catalyst strength of 4 psi (27 kPa) is necessary to prevent crushing of the catalyst in use.

Materials
Catalyst Supports and Alternative Entities:
1. Alumina spheres and alumina spheres impregnated with 0.5 wt % and 5 wt % platinum are available from Engelhard Corporation, Beachwood, OH.
2. Molybdenum pellets were prepared by chopping ⅛ inch (0.3 cm) molybdenum wire into ⅛ inch (0.3 cm) lengths. The wire is available from Astasta Industries, Houston, Tex.
3. Platinum/rhodium 40 mesh (16 strands/cm) gauze containing 90% platinum and 10% rhodium and made of 0.003 in (0.0076 cm) diameter wire) was obtained as Standard Gauze JM ALLOY #01903 from Johnson Matthey, Materials Technology Division, West Chester Pa.
4. Platinum foam was obtained from Astro Met, Inc., Cincinnati Ohio.
5. Platinum foil, in sheets 3×60 inches (7.6×152 cm) and 0.001 inches (0.0025 cm) thick was available from Surepure Chem tals, Inc., Florham Park, N.J.
6. The induction generator used for the examples was an Amplifier Model Ultra 8K, available from Henry Radio, Los Angeles Calif.

EXAMPLES 1–43

Synthesis of HCN

HCN was prepared by reacting a slight molar excess of ammonia with methane in an inductively heated continuous flow fixed-bed reactor system. The ratios for ammonia and methane are show in Table 1 below. The reactor was essentially a quartz tube 25 mm outside diameter, 19 mm inside diameter, and 40 cm in length with appropriate fittings to connect the feed manifold, product delivery unit, and a thermocouple. Catalyst, as various susceptor entities described in Table 1, was placed in the quartz tube to form a catalyst bed of approximately 8 cm in length and retained in place with layers of inert packing materials, such as alumina foam. The tube was mounted inside spiral induction heating coils. Heating in the catalyst bed was achieved by coupling the energy from the power source into the main coil enclosing the reactor through a secondary coil placed parallel to the main coil. Catalyst temperatures were about 1100 degrees C., measured at the center of the catalyst bed. The coils were insulated with refractory material and the induction heating apparatus was mounted in an aluminum enclosure. The reactor feed system was designed to allow up to two gas feeds into the reaction zone at a constant flow rate. The gases were metered and monitored using Brooks mass flow controllers. Product identification and quantitation were made by gas chromatography. Induction heating was supplied at a constant frequency of 26 MHz and the forward and reflected powers were adjusted to obtain the desired output. The susceptor entity configurations are shown in Table 1 together with reaction conditions and the products obtained. The dimensions of the susceptor entity and alternative entity for Examples 1 to 11 and 20 to 43 are 3 mm and 3.3 mm repectively.

EXAMPLES 1–11

The catalyst comprised a random mixture of 3 mm diameter commercially prepared 5 wt % Pt on alumina catalyst spheres and the same 5 wt % Pt on alumina catalyst that had been wrapped with Pt/Rh gauze such that the total volume of the catalyst was 20 cc and the total precious metal weight was 9.53 g. Reaction conditions, conversions, yields etc. are set forth in Table 1.

TABLE 1

| Ex. No. | Flow rates (sccm*) NH3 | Flow rates (sccm*) CH4 | Residence Time (s) | Power Supplied (W) | Conversion from Methane (%) | Conversion from Ammonia (%) | Yield based on Ammonia HCN (%) |
|---|---|---|---|---|---|---|---|
| 1  | 800  | 777  | 0.76 | 825  | 99.6  | 100.0 | 92.3 |
| 2  | 800  | 777  | 0.76 | 865  | 99.6  | 100.0 | 93.0 |
| 3  | 800  | 777  | 0.76 | 868  | 99.6  | 100.0 | 93.i |
| 4  | 800  | 777  | 0.76 | 865  | 99.6  | 100.0 | 91.4 |
| 5  | 800  | 777  | 0.76 | 860  | 100.0 | 100.0 | 92.9 |
| 6  | 1060 | 1043 | 0.57 | 970  | 99.6  | 100.0 | 94.6 |
| 7  | 1060 | 1043 | 0.57 | 965  | 99.6  | 100.0 | 93.8 |
| 8  | 1060 | 1043 | 0.57 | 970  | 100.0 | 100.0 | 93.9 |
| 9  | 1060 | 1043 | 0.57 | 968  | 100.0 | 100.0 | 93.2 |
| 10 | 1590 | 1565 | 0.38 | 1130 | 98.8  | 99.6  | 94.2 |
| 11 | 1590 | 1565 | 0.38 | 1170 | 99.6  | 100.0 | 93.9 |

*standard cubic centimeters per minute

EXAMPLES 12–19

The Pt foam used in this experiment was 19 mm diameter and 13 mm height. The density of the Pt foam was 1.9 g/cm$^3$. Results are given in Table 2.

TABLE 2

| Ex. No. | Flow rates (sccm*) NH3 | Flow rates (sccm*) CH4 | Residence Time (s) | Power Supplied (W) | Conversion from Methane (%) | Conversion from Ammonia (%) | Yield based on Ammonia HCN (%) |
|---|---|---|---|---|---|---|---|
| 12 | 800  | 650 | 0.15 | 462 | 97.8  | 92.4 | 84.9 |
| 13 | 800  | 650 | 0.15 | 442 | 100.0 | 99.2 | 88.0 |
| 14 | 800  | 650 | 0.15 | 442 | 100.0 | 94.3 | 82.8 |
| 15 | 800  | 650 | 0.15 | 442 | 100.0 | 95.3 | 83.7 |
| 16 | 1060 | 940 | 0.11 | 505 | 94.3  | 90.9 | 85.1 |
| 17 | 1060 | 940 | 0.11 | 532 | 96.0  | 93.6 | 84.4 |
| 18 | 1060 | 940 | 0.11 | 550 | 97.2  | 95.1 | 84.7 |
| 19 | 1060 | 940 | 0.11 | 550 | 97.2  | 95.0 | 84.5 |

EXAMPLES 20–29

In Table 3, the catalyst comprised a random mixture of 3 mm diameter commercially prepared 5 wt % Pt on alumina catalyst spheres and 3 mm diameter alumina spheres that had been wrapped with Pt/Rh gauze such that the total catalyst volume was 20 cc and the total precious metal weight was 11.9 g.

TABLE 3

| Ex. No. | Flow rates (sccm*) NH3 | Flow rates (sccm*) CH4 | Residence Time (s) | Power Supplied (W) | Conversion from Methane (%) | Conversion from Ammonia (%) | Yield based on Ammonia HCN (%) |
|---|---|---|---|---|---|---|---|
| 20 | 800  | 777  | 0.76 | 730  | 97.1 | 100.0 | 95.0 |
| 21 | 800  | 777  | 0.76 | 730  | 98.0 | 100.0 | 97.6 |
| 22 | 800  | 777  | 0.76 | 825  | 98.4 | 100.0 | 98.4 |
| 23 | 1060 | 1045 | 0.57 | 770  | 95.2 | 99.6  | 98.8 |
| 24 | 1060 | 1045 | 0.57 | 818  | 98.0 | 100.0 | 99.2 |
| 25 | 1060 | 1045 | 0.57 | 818  | 98.0 | 100.0 | 99.2 |
| 26 | 1590 | 1565 | 0.38 | 962  | 95.5 | 99.6  | 98.8 |
| 27 | 1590 | 1565 | 0.38 | 1012 | 97.6 | 100.0 | 99.2 |
| 28 | 1590 | 1565 | 0.38 | 1055 | 98.0 | 100.0 | 97.6 |
| 29 | 1590 | 1565 | 0.38 | 1050 | 97.6 | 100.0 | 97.6 |

EXAMPLES 30–40

The catalyst in Table 4 consisted of Pt/Rh gauze that had been crumpled into individual 3–4 mm diameter spheres such that the total catalyst volume was 20 cc and the total precious metal weight was 44.5 g.

TABLE 4

| Ex. No. | Flow rates (sccm*) | | Residence Time (s) | Power Supplied (W) | Conversion from | | Yield based on Ammonia HCN (%) |
|---|---|---|---|---|---|---|---|
| | NH3 | CH4 | | | Methane (%) | Ammonia (%) | |
| 30 | 800  | 777  | 0.76 | 880  | 89.4 | 98.0 | 89.0 |
| 31 | 1060 | 1043 | 0.57 | 1065 | 88.4 | 97.2 | 87.5 |
| 32 | 1060 | 1043 | 0.57 | 1060 | 88.7 | 97.6 | 87.8 |
| 33 | 1590 | 1565 | 0.38 | 1160 | 80.0 | 89.8 | 78.2 |
| 34 | 1590 | 1565 | 0.38 | 1165 | 80.2 | 89.3 | 77.7 |
| 35 | 2200 | 2000 | 0.29 | 1505 | 97.9 | 99.6 | 87.5 |
| 36 | 2200 | 2000 | 0.29 | 1508 | 96.7 | 98.5 | 85.8 |
| 37 | 2750 | 2500 | 0.23 | 1612 | 92.5 | 95.4 | 84.5 |
| 38 | 2750 | 2500 | 0.23 | 1660 | 93.7 | 96.5 | 84.8 |
| 39 | 2750 | 2500 | 0.23 | 1710 | 96.2 | 98.1 | 85.2 |
| 40 | 3300 | 3000 | 0.19 | 1930 | 82.9 | 91.1 | 80.1 |

EXAMPLES 41–43

In Table 5, the catalyst comprised a random mixture of 3 mm diameter commercially prepared 5 wt % Pt on alumina catalyst spheres and 3 mm diameter ×3–4 mm long Molybdenum pellets that had been wrapped with Pt/Rh gauze such that the total catalyst volume was 20 cc and the total precious metal weight was 7.37 g.

TABLE 5

| Ex. No. | Flow rates (sccm*) | | Residence Time (s) | Power Supplied (W) | Conversion from | | Yield based on Ammonia HCN (%) |
|---|---|---|---|---|---|---|---|
| | NH3 | CH4 | | | Methane (%) | Ammonia (%) | |
| 41 | 800 | 777 | 0.76 | 990  | 92.9 | 99.6 | 94.5 |
| 42 | 800 | 777 | 0.76 | 1000 | 87.3 | 98.0 | 96.3 |
| 43 | 800 | 777 | 0.76 | 1145 | 92.7 | 99.6 | 95.5 |

EXAMPLE 44

Simulation of an Induction Heated Catalytic Bed with 3.8 cm Susceptor Entities.

A simulated reactor was constructed to test catalyst forms in the 30 kHz frequency range. A 20-turn coil was made from 0.3 cm copper tubing wrapped around an acrylic tube of outside diameter 24 cm and inside diameter 20 cm. The length of the coil covered 30 cm of the acrylic tubing. Inside the coil about 100 cylindrical plastic pieces (simulated susceptor entities), individually wrapped in 25 $\mu$m thick lead foil, were placed. Each cylinder was 3.8 cm in diameter and height. The "equality factor" of the coil at the frequency of 30 kHz was measured before and after the cylindrical pieces were placed inside. A calculation based on these quality factors showed an induction efficiency of 96%, indicating only 4% of the electrical energy fed into the coil is wasted in form of heat in the coil itself, and 96% is deposited into the lead covering on the cylinders. Such a reactor has structural similarity to the susceptor entities and reactor configuration of this invention. Lead has comparable conductivity to platinum. Such simulation techniques are widely used in induction science to measure efficiencies. The induction efficiency, $\eta$ is defined as the ratio of power deposited in the load (the susceptor entities), $P_s$, over the total power fed to the induction coil,:

$$\eta = P_s/P_i$$

and the efficiency $\eta$ also is:

$$\eta = 1 - Q_l/Q_u$$

wherein $Q_l$ is the "Quality Factor" of the coil when it is loaded with the susceptors, and $Q_u$ is the quality factor when the coil is unloaded. Quality factor of a coil can be measured readily using an instrument such as Hewlett Packard LCR Meter Model #4275A.

EXAMPLE 45

Simulation of an Induction Heated Catalytic Bed with 3.8 cm Susceptor Entities at Various Frequencies.

The procedure of Example 44 was repeated at various induction frequencies. By the methodology of Example 44, the following induction efficiencies were measured:

| Frequency (kHz) | Efficiency |
|---|---|
| 10 | 89 |
| 20 | 93 |
| 30 | 96* |

*as Example 44.

The data of Example 45 indicate the critical frequency $f_c$ for the susceptor entities is approximately 10 kHz.

EXAMPLE 46

Simulation of an Induction Heated Catalytic Bed with 0.635 cm Susceptor Entities.

The procedure of Example 44 was repeated using 0.635 cm nylon spheres wrapped with 25 mm lead foil. The wrapped spheres were placed in a 4 cm tube with a coil on the outside. Such a reactor has structural similarity to the susceptor entities and reactor configuration of this invention. By the methodology of Example 44, the following induction efficiencies were measured:

| Frequency (kHz) | Efficiency |
|---|---|
| 20 | 10% |
| 40 | 24% |
| 100 | 57% |
| 200 | 82% |
| 400 | 92% |

What is claimed is:

1. A process for preparing HCN in a gas phase reaction at elevated temperature comprising the steps of:
   (a) contacting one or more compounds which contain carbon, hydrogen and nitrogen with a catalyst bed comprising a substantially uniformly distributed multiplicity of discrete metallic susceptor entities substantially uniformly distributed in a three dimensional array, wherein electrical conductivity between said entities is substantially less than surface conductivity of said entities, and wherein said entities comprise one or more metals from Groups Ib, IIb, IIIa, IVa, IVb, Vb, VIb, VIIb, or VIII, and wherein said entities have sufficient electrical conductivity and wherein size and geometry of said entities are such that said entities provide a sufficiently large eddy current path in a plane of a coil induced current to have sufficient induction heating efficiency and sufficient surface area to promote catalytic activity; and
   (b) heating said entities directly and individually by induction heating using an induction coil at a frequency between 50 Hz to 30 MHz to a temperature sufficient to effect reaction of said compounds.

2. The process of claim 1 wherein said frequency range between 3 KHz to 30 MHz.

3. The process of claim 1 wherein said frequency range between 3 KHz to 450 KHz.

4. The process of claim 1 further characterized in that said catalyst bed additionally contains alternative entities which lack inductive efficiency.

5. The process of claim 1 wherein said alternative entities additionally lack catalytic activity.

6. The process of claim 1 wherein the maximum diameter of said susceptor entity is between 0.125 and 0.25 times the transverse diameter of said catalyst bed.

7. The process of claim 1 wherein said entities comprise a ceramic core wrapped or coated by one or more of said metals.

8. The process of claim 1 wherein said entities comprise a core of either a clay, alumina, silica, zirconia, titanium dioxide, beryl or graphite wrapped or coated by one or more of said metals.

9. The process of claim 1 wherein said entities comprise an electrically conductive metallic core wrapped or coated by one or more of said metals.

10. The process of claim 1 wherein said entity comprises substantially planar catalytic metal annuli, which are distributed over and secured to porous retainer plates, with none of the annuli contacting one another, the porosity of said retainer plates being sufficient to permit the passage of gaseous materials.

11. The process of claim 1 wherein said susceptor entities comprise parallel rods held in place by porous retainers, said rods being wrapped, coated, or surface-impregnated with catalytic metal on the outside, and can be solid or hollow tubes having both ends closed.

12. The process of claim 1 wherein said catalyst bed has a length which is 0.5 to 10 times its diameter.

13. The process of claim 1 wherein said catalyst bed has a length which is 1 to 5 times its diameter.

14. The process of claim 13 wherein said susceptor entities comprise a platinum group metal.

15. The process of either claim 1, 2, 3, 4, 5, 6, 7, 8, 9, 10, 11, 12, or 13 wherein ammonia is reacted with methane.

* * * * *